US012714972B2

(12) United States Patent
Sun et al.

(10) Patent No.: US 12,714,972 B2
(45) Date of Patent: Aug. 25, 2026

(54) GAS SEPARATION MEMBRANE, AND PREPARATION METHOD THEREFOR AND USE THEREOF

(71) Applicants: Changshu 3F Zhonghao New Chemical Materials Co., Ltd., Jiangsu (CN); Shanghai Huayi 3F New Materials Co., Ltd., Shanghai (CN); Changshu 3F Zhenfu New Materials Co., Ltd., Suzhou (CN)

(72) Inventors: Xingxing Sun, Shanghai (CN); Shuyu Liu, Shanghai (CN); Bo Huang, Shanghai (CN); Lifeng Song, Shanghai (CN); Lijun Du, Shanghai (CN); Junyi Wu, Shanghai (CN)

(73) Assignee: Changshu 3F Zhonghao New Chemical Materials Co., Ltd., Jiangsu (CN)

( * ) Notice: Subject to any disclaimer, the term of this patent is extended or adjusted under 35 U.S.C. 154(b) by 300 days.

(21) Appl. No.: 18/694,130

(22) PCT Filed: Oct. 26, 2021

(86) PCT No.: PCT/CN2021/126268

§ 371 (c)(1),
(2) Date: Mar. 21, 2024

(87) PCT Pub. No.: WO2023/050503

PCT Pub. Date: Apr. 6, 2023

(65) Prior Publication Data

US 2025/0135407 A1 May 1, 2025

(30) Foreign Application Priority Data

Sep. 28, 2021 (CN) .......................... 202111143542.0

(51) Int. Cl.

| | |
|---|---|
| ***B01D 71/32*** | (2006.01) |
| ***B01D 67/00*** | (2006.01) |
| ***C01B 3/50*** | (2026.01) |
| ***C01B 3/503*** | (2026.01) |

(52) U.S. Cl.

CPC ......... *B01D 71/32* (2013.01); *B01D 67/0002* (2013.01); *C01B 3/503* (2013.01); *C01B 2203/0405* (2013.01)

(58) Field of Classification Search

CPC .. B01D 71/32; B01D 67/0002; B01D 71/281; B01D 71/44; B01D 2256/245; B01D 2257/108; B01D 2257/504; B01D 71/62; B01D 2323/30; B01D 2323/081; B01D 71/78; B01D 67/00; C01B 3/503; C01B 2203/0405; C01B 3/50; Y02E 60/50; G02B 5/305; Y02P 20/151; C08F 12/20; C08F 12/30; C08F 212/20; C08F 8/34; B32B 2255/26

USPC .............................................................. 95/51

See application file for complete search history.

(56) References Cited

U.S. PATENT DOCUMENTS

| | | | | |
|---|---|---|---|---|
| 4,586,939 | A | 5/1986 | Li | |
| 5,422,411 | A * | 6/1995 | Wei | C08F 212/30 526/292.9 |
| 5,834,523 | A | 11/1998 | Steck et al. | |
| 2001/0056128 | A1 | 12/2001 | Steck et al. | |
| 2004/0059015 | A1 | 3/2004 | MacKinnon | |
| 2009/0277837 | A1 | 11/2009 | Liu et al. | |
| 2011/0077312 | A1* | 3/2011 | Liu | B01D 71/82 521/27 |
| 2012/0322646 | A1 | 12/2012 | Liu et al. | |
| 2016/0215132 | A1* | 7/2016 | Zheng | C08F 12/20 |

FOREIGN PATENT DOCUMENTS

| | | | |
|---|---|---|---|
| CN | 1688624 | A | 10/2005 |
| CN | 101759832 | A | 6/2010 |
| CN | 102489174 | A | 6/2012 |
| CN | 107429024 | A | 12/2017 |
| CN | 107828001 | A | 3/2018 |
| CN | 108114615 | A | 6/2018 |
| CN | 109152981 | A | 1/2019 |
| CN | 111019133 | A | 4/2020 |

OTHER PUBLICATIONS

PCT International Search Report and Written Opinion, PCT/CN2021/126268, Jun. 24, 2022, 17 pages.

The State Intellectual Property Office of the People's Republic of China, Search Report, Application No. 202111143542.0, Jun. 5, 2023, 3 pages [No English Language Translation Available].

* cited by examiner

*Primary Examiner* — Qianping He

(74) *Attorney, Agent, or Firm* — Quarles & Brady LLP

(57) ABSTRACT

A gas separation membrane, a preparation method therefor, and the use thereof in which the gas separation membrane comprises 60-100 mol % of a monomeric unit derived from α,β,β-trifluorostyrene, and has an intrinsic viscosity of 0.5-5.0 dL/g and a tensile strength of at least 50 MPa. According to the GB/T 1038-2000 test method test, the permeability coefficient of hydrogen is at least 100 barrer.

7 Claims, No Drawings

GAS SEPARATION MEMBRANE, AND PREPARATION METHOD THEREFOR AND USE THEREOF

CROSS-REFERENCE TO RELATED APPLICATIONS

This application represents the U.S. national stage entry of International Application No. PCT/CN2021/126268 filed Oct. 26, 2021, which claims priority to Chinese Application No. 202111143542.0 filed Sep. 28, 2021, the disclosure of which is incorporated herein by reference in its entirety and for all purposes.

TECHNICAL FIELD

The present invention relates to a gas separation membrane for separating a gas (especially carbon dioxide and/or hydrogen) from a gas mixture of methane. The gas separation membrane according to the present invention has excellent gas selectivity, good gas permeation rate, excellent mechanical performance, as well as excellent heat resistance and chemical resistance at the same time.

TECHNICAL BACKGROUND

Compared with conventional separation methods such as pressure swing adsorption and low-temperature distillation, the gas separation membrane separation method possesses various advantages such as high efficiency, energy saving, simple process operation, and small footprint since it does not involve temperature change and phase change processes. Therefore, it has important applications in traditional industries, including hydrogen recovery from the synthetic ammonia industry and separation and enrichment of oxygen and nitrogen in the air and the like. High-performance gas separation membranes are also widely used for capturing carbon dioxide from the exhaust gas of thermal power plants and from natural gas wells, which can significantly reduce greenhouse gas emissions.

At present, commercially available gas separation membranes mainly include polymer membranes such as polydimethylsiloxane membranes (PDMS), cellulose membranes (CA), and polysulfone membranes (PSF), etc. However, the glass transition temperature of these gas separation membranes rarely exceeds 200° C., thus limiting their application in harsh environments such as high temperatures for their low operating temperature and poor heat resistance.

Common fluorinated materials such as PTFE and FEP exhibit excellent heat resistance and chemical stability. However, their high crystallinity and low free volume fraction result in relatively low gas permeation rates of the membranes. In addition, these fluorinated materials are difficult to dissolve and may only be processed through limited processing methods such as melting and sintering. In recent years, amorphous fluorinated polymer products have been developed and successfully commercialized by introducing cyclic copolymerization groups into the fluorinated main chain, which impedes the close stacking of molecular chains and reduces crystallinity.

For example, EP0073087A1 of Dupont (US) discloses the production of Teflon AF series products by copolymerizing perfluoro-2,2-dimethyl-1,3-dioxole monomers with tetrafluoroethylene. U.S. Pat. No. 4,897,457A of AGC Japan discloses the production of Cytop™ products through cyclopolymerization of perfluoro (4-vinyloxy-1-butene) monomers. U.S. Pat. No. 5,883,177A of Solvay discloses the production of Hyflon AD products by copolymerizing 2,2,4-trifluoro-5-trifluoromethane-1,3-dioxacyclopentene with TFE. These amorphous fluorinated polymers not only have excellent heat and chemical stability, but also have high free volume, unique gas permeability, and good solubility in fluorinated solvents. Therefore, they can be made good gas separation membrane materials through solution processing and other methods. However, these amorphous fluoropolymer materials still have many problems, such as low gas selectivity despite the high gas permeability coefficient, low mechanical properties such as tensile strength and high pressure resistance. They may only be soluble in a few fluorinated solvents, such as FC-72, perfluorobenzene, while many fluorinated solvents are typically ozone layer destroyers. In addition, the complex synthesis steps of comonomers thereof lead to high cost of copolymers and membranes.

Hydrogen is the most promising green energy source. However, there are almost no free hydrogen molecules in nature. Currently, the most efficient and environmentally friendly method of hydrogen preparation is methane cracking, in which the separation of the hydrogen/methane mixture is a key step in the preparation of high-purity hydrogen. Additionally, industrial production generates a large amount of exhaust gas rich in a hydrogen/methane mixture, from which the effective separation of hydrogen would yield significant economic and social benefits.

To effectively separate hydrogen from a hydrogen/methane mixture, Chinese patent CN108114580A proposes a separation membrane, which is formed by reacting $Zn^{2+}$, polybenzimidazole, and dimethyl sulfoxide in a molar ratio of 1-4:1:10-50 as film-forming materials and then drying them to form a film. This membrane has a $H_2/CH_4$ separation coefficient of 20.6 under a temperature of 25° C. and a transmembrane pressure difference of 1 bar.

Removing carbon dioxide from methane mixtures is an important step in the purification of methane. Various methods for separating carbon dioxide have been provided in the prior art. For example, CN112368066A discloses a carbon dioxide separation membrane with an amino-containing grafted polymer surface, which comprises a permeable (i.e., porous) support layer and a permeable polymer layer surface-modified with polymer chains containing $CO_2$-philic groups. Although this separation membrane shows high $CO_2/CH_4$ selectivity, it does not mention whether this membrane can be used to separate hydrogen from methane mixtures.

Although separation membranes in the prior art are capable of obtaining high hydrogen or carbon dioxide separation coefficients, the hydrogen separation coefficients of such separation membranes can be further improved. Furthermore, in addition to hydrogen separation coefficients (gas selectivity), separation membranes are also required to have good mechanical properties, heat resistance, chemical resistance, etc. It is also expected that these gas separation membranes can be used for both separating hydrogen from methane/hydrogen mixtures and separating carbon dioxide from methane/carbon dioxide mixtures.

SUMMARY OF THE INVENTION

Therefore, one object of the present invention is to provide a gas separation membrane that has an improved $H_2/CH_4$ separation coefficient and excellent mechanical properties, as well as excellent heat and chemical resistance. It can also be used for separating carbon dioxide from methane/carbon dioxide mixtures.

Another object of the present invention is to provide a method for manufacturing said gas separation membrane.

Another object of the present invention is to provide a use of the gas separation membrane for separating hydrogen from a gas mixture containing hydrogen/methane.

Yet another object of the present invention is to provide a use of the gas separation membrane for separating carbon dioxide from a gas mixture containing methane/carbon dioxide.

Therefore, one aspect of the present invention relates to a gas separation membrane comprising 60-100 mol % of a monomeric unit derived from α,β,β-trifluorostyrene. The gas separation membrane has a resin intrinsic viscosity of 0.5-5.0 dL/g, a tensile strength of at least 50 MPa, and a permeability coefficient for hydrogen of at least 100 barrer.

Another aspect of the present invention relates to a method for manufacturing the gas separation membrane, which comprises the following steps:

a) providing a polymer solution, wherein the polymer comprises 60-100 mol % of a monomeric unit derived from α,β,β-trifluorostyrene, and has an intrinsic viscosity of 0.5-5.0 dL/g;
b) applying the polymer solution to a substrate plane and drying it.

Yet another aspect of the present invention relates to a use of the gas separation membrane for separating hydrogen from a gas mixture containing hydrogen/methane.

A further aspect of the present invention relates to a use of the gas separation membrane for separating carbon dioxide from a gas mixture containing methane/carbon dioxide.

DETAILED DESCRIPTION

1. Gas Separation Membrane

The gas separation membrane of the present invention is a polymer membrane made from a α,β,β-trifluorostyrene homopolymer or copolymer. Such polymer comprises a monomeric unit derived from α,β,β-trifluorostyrene. Based on the total amount of polymer, the content of the monomeric unit derived from α,β,β-trifluorostyrene is 60-100 mol %, preferably 70-100 mol %, more preferably 80-100 mol %, still more preferably 90-100 mol %, and most preferably 95-100 mol %.

In an example of the present invention, suitable comonomers are selected from the group consisting of tetrafluoroethylene, hexafluoropropylene, perfluoromethyl vinyl ether, perfluoroethyl vinyl ether, perfluorpropylene vinyl ether, trifluorochloroethylene, trifluoroethylene, fluoroethylene, α,β-difluorostyrene, β,β-difluorostyrene, α-fluorostyrene, β-trifluorostyrene, styrene, methyl acrylate, methyl methacrylate, butyl acrylate, butyl methacrylate, 2-ethylhexyl acrylate, acrylic acid, methacrylic acid, methylstyrene, p-methylstyrene, acrylonitrile, butadiene, isoprene or a combination of two or more thereof.

Preferably, suitable comonomers are selected from the group consisting of α,β-difluorostyrene, β,β-difluorostyrene, α-fluorostyrene, β-fluorostyrene, styrene, or a combination of two or more thereof.

Suitable α,β,β-trifluorostyrene homopolymers or copolymers may be made by any conventional manufacturing method known in the art without particular limitations, or may be commercially available. In an example of the present invention, said α,β,β-trifluorostyrene homopolymer or copolymer is commercially available from SHANGHAI 3F NEW MATERIALS CO., LTD.

The gas separation membrane of the present invention made from a α,β,β-trifluorostyrene homopolymer or copolymer has a resin intrinsic viscosity of 0.5-5.0 dL/g, preferably 0.6-4.0 dL/g, more preferably 0.7-3.0 dL/g, and most preferably 0.8-2.5 dL/g.

The gas separation membrane of the present invention has a tensile strength of at least 50 MPa, preferably 55-95 MPa, more preferably 60-90 MPa, and most preferably 65-85 MPa (test method: GB/T 1040-2006).

According to the GB/T 1038-2000 test method, the gas separation membrane of the present invention gas has a permeability coefficient for hydrogen of at least 100 barrer, preferably 105-200 barrer, more preferably 110-190 barrer, and most preferably 120-185 barrer.

According to the GB/T 1038-2000 test method, the gas separation membrane of the present invention gas has a permeability coefficient for carbon dioxide of at least 60 barrer, preferably 60-100 barrer, more preferably 70-95 barrer, and most preferably 75-90 barrer.

According to the GB/T 1038-2000 test method, the gas separation membrane of the present invention gas has a permeability coefficient for methane of no more than 7 barrer, preferably no more than 6.8 barrer, more preferably no more than 6.6 barrer, and most preferably no more than 6.5 barrer.

The gas separation membrane of the present invention has a separation coefficient for hydrogen/methane of at least 20, preferably 20-50, more preferably 20.2-45, and most preferably 20.4-40 (test method: GB/T 1038-2000, separation coefficient (gas selectivity)=$P(H_2)/P(CH_4)$).

The gas separation membrane of the present invention has a separation coefficient for carbon dioxide/methane of at least 10, preferably 10-20, more preferably 11-19, and most preferably 12-18 (test method: GB/T 1038-2000, separation coefficient (gas selectivity)=$P(CO_2)/P(CH_4)$).

In an example of the present invention, the gas separation membrane has a thickness of 10-100 microns, preferably 15-80 microns, preferably 20-70 microns, and preferably 25-60 microns.

In an example of the present invention, the α,β,β-trifluorostyrene homopolymer or copolymer has a glass transition temperature of 180-280° C., preferably 200-250° C., more preferably 210-240° C.

2. Manufacturing Method of the Gas Separation Membrane a) providing a polymer solution, wherein the polymer comprises 60-100 mol % of a monomeric unit derived from α,β,β-trifluorostyrene, and has an intrinsic viscosity of 0.5-5.0 dL/g.

The polymer used to form the polymer solution comprises a monomeric unit derived from α,β,β-trifluorostyrene. Based on the total amount of polymer, the content of the monomeric unit derived from α,β,β-trifluorostyrene is 60-100 mol %, preferably 70-100 mol %, more preferably 80-100 mol %, still more preferably 90-100 mol %, and most preferably 95-100 mol %.

In an example of the present invention, suitable comonomers of the polymer are selected from the group consisting of tetrafluoroethylene, hexafluoropropylene, perfluoromethyl vinyl ether, perfluoroethyl vinyl ether, perfluorpropylene vinyl ether, trifluorochloroethylene, trifluoroethylene, fluoroethylene, α,β-difluorostyrene, β,β-difluorostyrene, α-fluorostyrene, β-trifluorostyrene, styrene, methyl acrylate, methyl methacrylate, butyl acrylate, butyl methacrylate, 2-ethylhexyl acrylate, acrylic acid, methacrylic acid, methylstyrene, p-methylstyrene, acrylonitrile, butadiene, isoprene or a combination of two or more thereof.

Preferably, suitable comonomers are selected from the group consisting of α,β-difluorostyrene, β,β-difluorostyrene, α-fluorostyrene, β-fluorostyrene, styrene, or a combination of two or more thereof.

Suitable α,β,β-trifluorostyrene homopolymers or copolymers may be made by any conventional manufacturing method known in the art without particular limitations, or may be commercially available. In an example of the present invention, the α,β,β-trifluorostyrene homopolymer or copolymer is commercially available from SHANGHAI 3F NEW MATERIALS CO., LTD.

The polymer used to form the polymer solution has an intrinsic viscosity of 0.5-5.0 dL/g, preferably 0.6-4.0 dL/g, more preferably 0.7-3.0 dL/g, and most preferably 0.8-2.5 dL/g.

The solvent used to form the polymer solution is selected from the group consisting of $C_{1-4}$ amides with nitrogen atom substituted by a methyl group, $C_{3-8}$ alkane ketones, aromatic ketones, esters, $C_{1-4}$ alkanes substituted by chlorine, chlorobenzenes or a mixture of two or more thereof, preferably $C_{1-4}$ amides with nitrogen atom substituted by a methyl group.

Suitable $C_{1-4}$ amides with nitrogen atom substituted by methyl group include N, N-dimethylacetamide, N, N-dimethylformamide or a mixture thereof.

Suitable C3-8 alkane ketones include methyl isopropyl ketone, acetone, methylethyl ketone, N-methylpyrrolidone, dimethyl sulfoxide or a mixture thereof.

Suitable aromatic ketones include acetophenone.

Suitable esters include ethyl acetate, propylene glycol methyl ether acetate, γ-butyrolactone or a mixture thereof.

Suitable C1-4 alkanes substituted by chlorine include chloroform, dichloromethane or a mixture thereof.

Suitable chlorobenzenes include monochlorobenzene, m-dichlorobenzene or a mixture thereof.

N,N-dimethylacetamide, N,N-dimethylformamide or a mixture thereof are preferred.

In a preferred example of the present invention, the polymer solution has a solid content concentration of 15-30 wt %, preferably 18-28 wt %, more preferably 20-25 wt %.

In a preferred example of the present invention, the polymer solution may optionally comprise an additive. Non-limiting examples of suitable additives include, for example:

- rosin acids, and hydrogenated derivatives, ester derivatives or combinations thereof, such as Abitol E (hydrogenated rosin), Permalyn 3100 (pentaerythritol ester of tall oil rosin), Permalyn 2085 (glycerol ester of tall oil rosin), Permalyn 6110 (pentaerythritol ester of rosin), Foralyn 110 (pentaerythritol ester of hydrogenated rosin);
- polybasic acid esters, such as Admex 523 (ethylene glycol dibasic ester), triphenyl phosphate, triethylene glycol diisooctanoate or a mixture of two or more thereof;
- preferably rosin esters, such as Permalyn 3100 (pentaerythritol ester of tall oil rosin), Permalyn 2085 (glycerol ester of tall oil rosin), Permalyn 6110 (pentaerythritol ester of rosin) or a mixture thereof.

The addition of the above additives to the polymer solution in combination with the gas separation membrane manufacture method of the present invention contribute to further enhancement of the hydrogen selectivity and other comprehensive performance of the gas separation membrane.

In an example of the present invention, the additives in the polymer solution has a concentration of 0-1 wt %, preferably 0.2-0.8 wt %, and more preferably 0.3-0.7 wt %.

b) applying the polymer solution to a substrate plane and drying it.

The method used to apply the polymer solution is not particularly limited and may be a conventional method known in the art. In an example of the present invention, the applying method is selected from one or more of knife coating, spin coating, shower coating, spray coating, dip coating, and roller coating.

The plane of the substrate used to form the polymer membrane is not particularly limited, as long as it does not affect the properties of the polymer membrane formed. Non-limiting examples include, for example, polyester sheets (PET), cyclic olefin polymer sheets (COP), triacetyl cellulose sheets (TAC), glass sheets, stainless steel sheets, or composite materials with a veneer of the above materials.

After application of the polymer solution, the method of the present invention includes a drying step. In an example of the present invention, the drying is carried out at a temperature of 60-250° C., preferably 80-220° C., more preferably 100-200° C., and most preferably 120-180° C. for a drying time of 2-6 hours, preferably 3-5 hours.

In a preferred example of the present invention, the drying is carried out in two steps: first at a temperature of 100-160° C., preferably 120-140° C. for 2-4 hours, preferably 2.5-3.5 hours; and subsequently at a temperature of 170-210° C., preferably 180-200° C. for 1-2 hours, more preferably 1.2-1.8 hours. The performance of the gas separation membrane may be further improved by using step-by-step drying method to produce the gas separation membrane.

In a preferred example of the present invention, the method of the present invention comprises dissolving an α,β,β-trifluorostyrene polymer resin with a predetermined intrinsic viscosity, an additive (e.g., Permalyn 6110) in a solvent (e.g., N,N-dimethylacetamide) to prepare a polytrifluorostyrene solution with a predetermined solid content. The polytrifluorostyrene solution is coated onto a substrate surface (e.g. a glass sheet) by means of a coating machine, after which the coated membrane is placed in an oven for drying (e.g., heat treatment at 140° C. for 2h, and then at 180° C. for 1h). A dense membrane is obtained after released from the substrate surface.

Compared with the prior art, the present invention provides a gas separation membrane comprising poly(α,β,β-trifluorostyrene) homopolymer or copolymer with perfluorinated main chain. The gas separation membrane exhibits excellent gas selectivity, gas permeation rate, mechanical performance, as well as heat and chemical resistance. It may be prepared by non-fluorine-containing conventional solution coating method. The gas separation membrane is suitable for the separation and recovery of carbon dioxide and hydrogen from natural gas mixtures, and for the separation and recovery of carbon dioxide from methane in the biomass gas or oil exploitation industries.

EXAMPLE

Referring to examples below, the present invention will be further described. The test methods for each test data of the gas separation membrane in the examples are as follows:

The glass transition temperature of polymer is tested in accordance with the national standard GB/T 19466.2-2004.

The tensile strength of membranes is tested in accordance with the national standard GB/T 1040-2006.

The gas permeability and gas selectivity are tested in accordance with GB/T 1038-2000 at 35° C. and 0.1 MPa.

Example 1

245 g of poly-α,β,β-trifluorostyrene resin (with an intrinsic viscosity of 2.13 dL/g) and 5 g of Permalyn 6110 were dissolved in 750 g of N,N-dimethylacetamide to prepare a solution with a solid content of 25 wt %. The polytrifluorostyrene solution was coated on the glass sheet by a coating machine (TQC Automatic Film applicator), after which the coated membrane was placed into an oven for drying at 140° C. for 2 h and then 180° C. for 1 h of heat treatment. A dense membrane was obtained after released from the glass sheet. The thickness of the dried membrane was 30 microns determined by a thickness gauge (Metricon 2010).

Example 2

250 g of poly-α,β,β-trifluorostyrene resin (with an intrinsic viscosity of 1.77 dL/g) was dissolved in 750 g of N,N-dimethylacetamide to prepare a solution with a solid content of 25 wt % without adding other additives. The remaining operations were the same as Example 1.

Example 3

A poly-α,β,β-trifluorostyrene resin with an intrinsic viscosity of 0.98 dL/g was prepare into a dense membrane of a thickness of 30 micron. The remaining operations were the same as Example 2.

Comparative Example 1

2.5 g of Teflon AF1600 resin was dissolved in 47.5 g of perfluorobenzene solvent to prepare a solution with a solid content of 5 wt %. The solution was coated on the glass sheet by a coating machine (TQC Automatic Film applicator), after which the coated membrane was placed into an oven for drying at 160° C. for 2 h and then 220° C. for 1 h of heat treatment. A dense membrane of a thickness of 30 micron was obtained after released from the glass sheet.

Example 4

A dense membrane was prepared using the same method as in Example 1, except for drying in an oven at 160° C. for 3.5h. A dense membrane was obtained after released. The thickness of the dried membrane was 30 microns determined by a thickness gauge (Metricon 2010).

Example 5

245 g of poly-α,β,β-trifluorostyrene resin (with an intrinsic viscosity of 2.13 dL/g) and 5 g of Permalyn 6110 were dissolved in 750 g of N-methylpyrrolidone to prepare a solution with a solid content of 25 wt %. The remaining operations were the same as Example 1.

| | Example 1 | Example 2 | Example 3 | Example 4 | Example 5 | Comp. Example 1 |
|---|---|---|---|---|---|---|
| Solid content of solution (wt %) | 25 | 25 | 25 | 25 | 25 | 5 |
| Intrinsic viscosity (dL/g) | 2.13 | 1.77 | 0.98 | 2.13 | 2.13 | — |
| Glass transition temperature (° C.) | 217 | 214 | 203 | 217 | 217 | 160 |
| Membrane tensile strength (MPa) | 85.3 | 82.2 | 72.5 | 71.1 | 72.7 | 27.0 |
| Gas permeation rate (barrer) | | | | | | |
| $P(H_2)$ | 180.3 | 175.5 | 109.7 | 175.2 | 178.5 | 495.0 |
| $P(CO_2)$ | 98.1 | 98.7 | 66.4 | 90.3 | 93.4 | 455.1 |
| $P(CH_4)$ | 5.9 | 6.2 | 5.3 | 5.7 | 5.8 | 101.2 |
| Gas selectivity | | | | | | |
| $\alpha$ ($H_2/CH_4$) | 36.6 | 28.3 | 20.7 | 30.7 | 30.8 | 4.9 |
| $\alpha$ ($CO_2/CH_4$) | 16.6 | 15.9 | 12.6 | 15.8 | 16.1 | 4.5 |

What is claimed is:

1. A method for manufacturing a gas separation membrane, comprising the following steps:

a) providing a polymer solution, wherein the polymer comprises 60-100 mol % of a monomeric unit derived from a,3, p-trifluorostyrene, and has an intrinsic viscosity of 0.5-5.0 dL/g;

b) applying the polymer solution to a substrate plane and drying it;

wherein the gas separation membrane has a tensile strength of at least 50 MPa, and a permeability coefficient for hydrogen of at least 100 barrer measured according to the GB/T 1038-2000 test method, wherein the drying is carried out in two steps: first at a temperature of 100-160° C. for 2-4 hours; and subsequently at a temperature of 170-210° C. for 1-2 hours.

2. The method according to claim 1, wherein the gas separation membrane comprises a monomeric unit derived from a comonomer selected from the group consisting of tetrafluoroethylene, hexafluoropropylene, perfluoromethyl vinyl ether, perfluoroethyl vinyl ether, perfluorpropylene vinyl ether, trifluorochloroethylene, trifluoroethylene, fluoroethylene, α,β-difluorostyrene, β,β-difluorostyrene, α-fluorostyrene, β-trifluorostyrene, styrene, methyl acrylate, methyl methacrylate, butyl acrylate, butyl methacrylate, 2-ethylhexyl acrylate, acrylic acid, methacrylic acid, methylstyrene, p-methylstyrene, acrylonitrile, butadiene, isoprene or a combination of two or more thereof.

3. The method according to claim 1, wherein the polymer has an intrinsic viscosity of 0.6-4.0 dL/g; and the gas separation membrane has a tensile strength of 55-95 MPa.

4. The method according to claim 1, wherein the gas separation membrane has a permeability coefficient for hydrogen gas of 105-200 barrer measured according to the GB/T 1038-2000 test method, a permeability coefficient for carbon dioxide of at least 60 barrer, and a permeability coefficient for methane of no more than 7 barrer.

5. The method according to claim 1, wherein the gas separation membrane has a separation coefficient for hydrogen/methane of at least 20 according to the GB/T 1038-2000 test method; and a separation coefficient for carbon dioxide/methane of at least 10.

6. The method according to claim 1, wherein the gas separation membrane has a glass transition temperature of 180-280° C.

7. The method according to claim 1, wherein the polymer solution comprises a solvent selected from the group consisting of $C_{1-4}$ amides with nitrogen atom substituted by a methyl group, $C_{3-8}$ alkane ketones, acetophenone, esters, $C_{1-4}$ alkanes substituted by chlorine, chlorobenzenes; and the polymer solution further comprises an additive selected from the group consisting of rosin esters or a mixture thereof.

* * * * *